May 4, 1965   J. COSPEN   3,181,607
FINNED HOLLOW ARTICLE
Original Filed June 15, 1959   2 Sheets-Sheet 1

INVENTOR
JEAN COSPEN
BY
ATTORNEYS

May 4, 1965  J. COSPEN  3,181,607
FINNED HOLLOW ARTICLE
Original Filed June 15, 1959  2 Sheets-Sheet 2
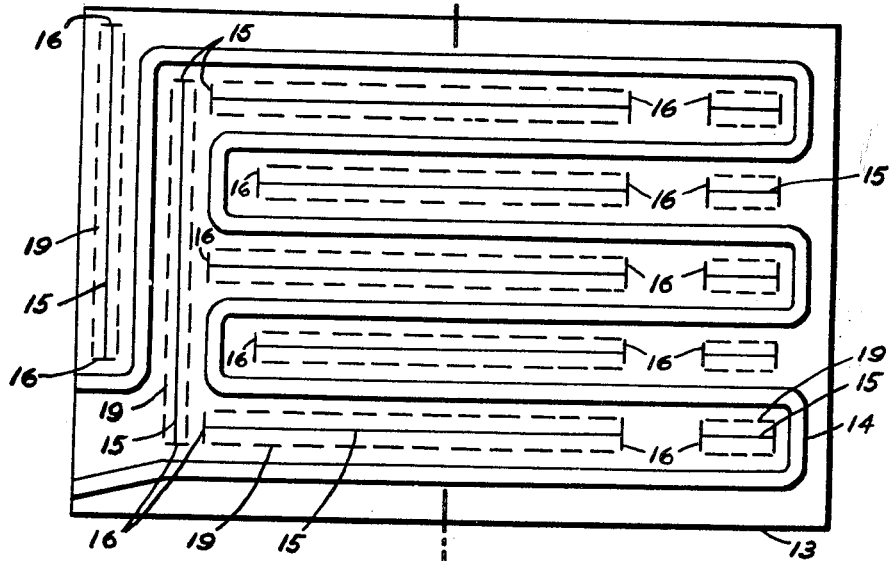
Fig. 3
Fig. 4
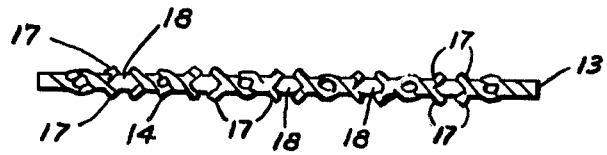
INVENTOR.
JEAN COSPEN
BY
ATTORNEYS

United States Patent Office 3,181,607
Patented May 4, 1965

---

3,181,607
FINNED HOLLOW ARTICLE
Jean Cospen, Cachan, France, assignor to Olin Mathieson Chemical Corporation, East Alton, Ill., a corporation of Virginia
Original application June 15, 1959, Ser. No. 820,244, now Patent No. 3,121,940, dated Feb. 25, 1964. Divided and this application Aug. 30, 1963, Ser. No. 318,462
2 Claims. (Cl. 165—170)

This application is a division of application Serial No. 820,244, filed June 15, 1959, now United States Patent No. 3,121,940, granted February 25, 1964.

This invention relates to hollow articles and more particularly to a heat exchanger having integral fins.

In accordance with the teachings contained in United States Patent No. 2,690,002, issued on September 28, 1954, a pattern of weld-inhibiting material is applied to a weldable surface of a metal sheet over which a second sheet is superimposed. The sheets are secured together to prevent relative movement between them and then pressure-welded together, as by rolling, in their adjacent areas not separated by the weld-inhibiting material. Subsequent to the pressure welding operation, the resultant sheets are usually softened by annealing and the unjoined portion defined by the pattern of weld-inhibiting material is outwardly expanded by injecting therein a fluid pressure of sufficient magnitude to permanently distend the sheets in the area adjacent the applied pattern of weld-inhibiting material. The expanded portions define a system of passageways for fluid flow. The aforesaid process is equally applicable to any number of superposed sheets having interposed between them an appropriate pattern of weld-inhibiting material. The resultant panel obtained by the aforesaid process is characterized by the absence of any interface between the complementary sheets forming the resultant panel providing improved characteristics when used as a heat exchanger.

It is often desirable that the heat exchange tubing for boilers, refrigerators, condensers and the like be provided with external fins. Such heat transfer fins are usually brazed or soldered on the tubing except where the tube structure is very heavy and permits the fins to be cast, extruded, or rolled. However, especially where the tubing is of the flat or oblong sheet metal type, thin walled tubing and the fins are usually brazed or soldered together. This is not only expensive and time consuming, but frequently fails to result in a rigid and efficient joint. Generally, a brazed or soldered joint is of reduced heat exchange efficiency for lack of unimpeded heat transfer through the joint. Another heretofore known method of forming fins is a helical rolling method which, however, has the disadvantage of requiring a fully formed round tube blank together with an internal mandrel and which has the further disadvantage of requiring a considerably thick tube wall and complicated apparatus and controls for the proper extension of integral fins. This prior method is not readily adapted to formation of fins in conjunction with relatively thin sheet metal walls.

Accordingly, one object of this invention is to provide a simple, low cost and improved design of finned heat exchangers.

Another object of this invention is to provide a novel and improved relatively thin and economical panel structure having integral flanges or fins suitable for various purposes such as strengthening or fastening for heat exchange.

Another object of this invention is to extend the surfaces of a heat exchanger fabricated according to the process of the aforesaid French patent without increasing the weight of the unit.

Other objects and advantages will become more apparent from the following drawings and description in which:

FIGURE 3 is a plan view illustrating a successive step in the fabrication of the finned heat exchanger from the embodiment of FIGURES 1 and 2; and FIGURE 4 illustrates one configuration of a finned heat exchanger that may be obtained from the panel depicted in FIGURE 3.

Figure 1:
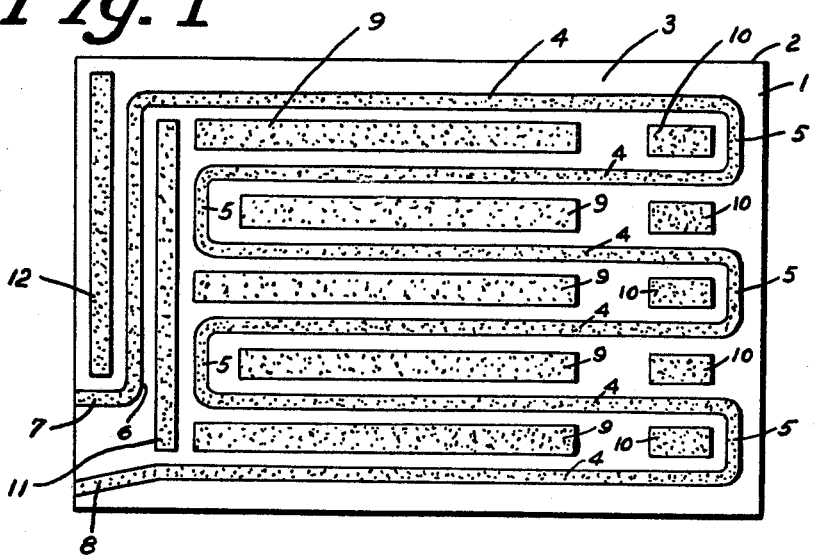
FIGURE 1 is a plan view of a sheet of metal having applied to it patterns of weld-inhibiting material according to one embodiment of this invention.

In accordance with this invention a pattern of weld-inhibiting material is applied to a clean weldable surface 1 of a metal sheet 2 so as to define a desired system of passageways 3. This pattern includes a series of stripes 4 interconnected at alternate adjacent terminal portions by lateral stripes 5. One of the longitudinal stripes 4, closest to a lateral edge, is connected to one end of a lateral stripe 6 whose other end extends longitudinally to the edge of sheet 2 by means of a stripe 7. Another longitudinal stripe 4, closest to the other lateral edge, is connected to a stripe 8 which extends to an edge of sheet 2.

A plurality of additional patterns of weld-inhibiting material is also provided on surface 1 of sheet 2. As illustrated in FIGURE 1 these additional patterns are applied in a rectangular configuration. A pair of these rectangular configurations, a long one 9 and a short one 10, are provided between each pair of adjacent longitudinal stripes 4. However, it is to be understood that a singular rectangular pattern of weld-inhibiting material can also be used. In addition, laterally extended rectangular patterns of weld-inhibiting material 11 and 12 are applied adjacent each side of laterally extending stripe 6.

Figure 2:
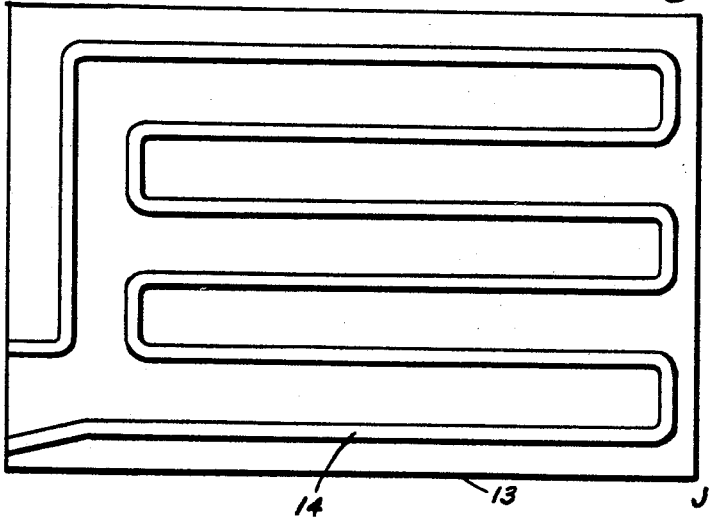
FIGURE 2 is a plan view of an embodiment of this invention illustrating a system of passageways distended in accordance with the pattern of weld-inhibiting material applied in FIGURE 1.

Subsequent to the application of the weld-inhibiting material on the surface of sheet 2, a second sheet is superimposed on its surface 1 and pressure welded thereto in the areas not separated by weld-inhibiting material in accordance with the aforesaid United States patent. The resultant pressure welded panel 13 is illustrated in FIGURE 2 with the unjoined portions defining the desired tubular passageways 14 expanded to facilitate the description of this invention. However, it is to be understood that the aforesaid passages may be either distended or undistended for fabrication of the desired structure of this invention.

Subsequent to the expansion of passages 14, the resultant unjoined portions defined by the rectangular configurations of broken lines 19 are bisected by slitting at 15, by any appropriate means such as shearing or punching or the like, in the direction lengthwise of the longest dimension of the rectangular configuration. Two additional slits 16 are provided at the terminal portions of slits 15 in a direction perpendicular thereto along the edges of the rectangular configuration 19. The resultant series of slits comprise a long slit 15 terminating perpendicularly in the mid-point of a short slit 16, forming in effect a T-shape at each end of slit 15. In each instance, slits 15 and 16 extend through both complementary portions of panel 13 adjacent the rectangular unjoined area resulting from the application of weld-inhibiting material. After the panel has been slitted, the aforesaid complementary portions are then separated from each other by bending along opposite unslitted edges of rectangle 5 so as to extend in opposite directions out of the plane of the panel to form fins or flanges 17 leaving openings 18 in the areas of the panel from which the fins or flanges 17 were formed.

Although a specific rectangular configuration for the finned patterns and a specific means of forming them has been described, it is to be understood that the fin patterns may be of any desired irregular or complex design. The fins may also be formed from the fin patterns by first expanding them followed by milling off the crest of the expanded fin patterns. And, although the primary purpose of this invention is directed to extending the heat exchange surface of a heat exchanger by provision of fins integral with the exchanger, it is to be understood that the resultant fins may be employed as flanges for fastening, spacers or any suitable purpose.

Although the invention has been described with reference to specific embodiments and details, various modifications and changes, within the scope of this invention, will be apparent to one skilled in the art and are contemplated to be embraced within the invention.

What is claimed is:

1. A hollow article comprising a solid, seamless, unitary metal sheet having within its interior a first unjoined portion defining a system of passageways, and a second unjoined portion terminating within all edges of said sheet and having complementary portions of said sheet integral with the entire sheet, adjacent said second unjoined portion, separated to extend in opposite directions out of the plane of said sheet to form an opening through said sheet.

2. A hollow article comprising a solid, seamless, unitary hollow sheet having within its interior a first unjoined portion defining a system of passageways for fluid flow bulged out of the plane of the sheet, and a second unjoined portion terminating within all edges of said sheet and having complementary portions of said sheet, adjacent said second unjoined portion, separated to extend in opposite directions out of the plane of said sheet to form an opening through said sheet, with the separated portions being integral with the walls of said passageways.

References Cited by the Examiner
UNITED STATES PATENTS

| 2,375,334 | 5/45 | Valyi et al. | 29—157.3 |
| 2,471,960 | 5/49 | Johnson | 165—170 X |
| 2,585,736 | 2/52 | Burr | 165—170 X |
| 2,690,002 | 9/54 | Grenell | 165—170 X |

CHARLES SUKALO, *Primary Examiner.*